Jan. 21, 1964 A. J. RADCLIFFE, JR., ETAL 3,118,974

ELECTRONIC SWITCHING TELEPHONE SYSTEM

Filed Sept. 1, 1959

6 Sheets-Sheet 1

INVENTOR.
A. J. RADCLIFFE, JR.
T. A. PICKERING

BY J. Warren Whitesel

ATTORNEY

Jan. 21, 1964 A. J. RADCLIFFE, JR., ETAL 3,118,974

ELECTRONIC SWITCHING TELEPHONE SYSTEM

Filed Sept. 1, 1959 6 Sheets-Sheet 2

LOGIC SYMBOLS

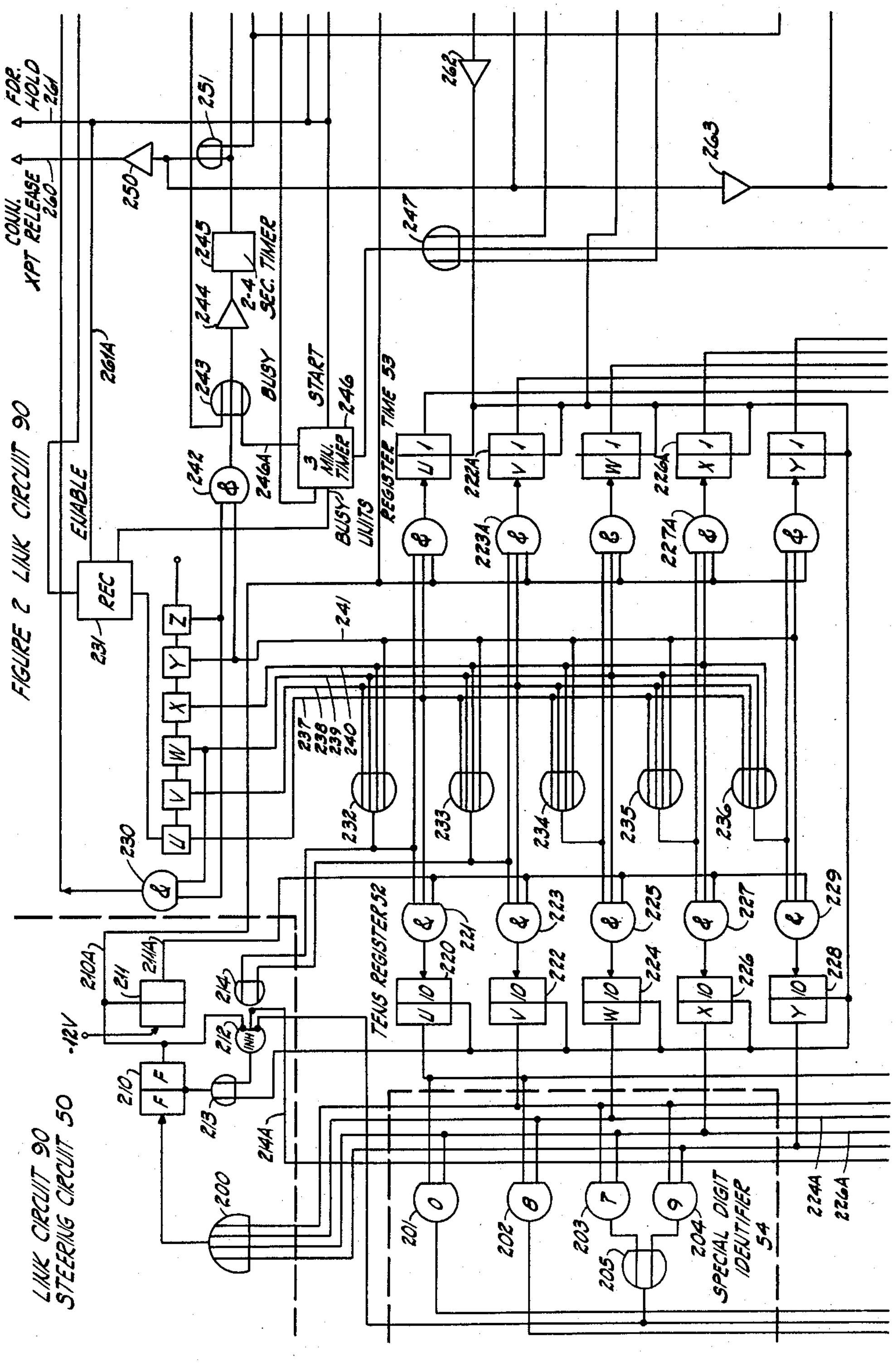
FIGURE 2 LINK CIRCUIT 90

Jan. 21, 1964 A. J. RADCLIFFE, JR., ETAL 3,118,974

ELECTRONIC SWITCHING TELEPHONE SYSTEM

Filed Sept. 1, 1959 6 Sheets-Sheet 4

Jan. 21, 1964 A. J. RADCLIFFE, JR., ETAL 3,118,974

ELECTRONIC SWITCHING TELEPHONE SYSTEM

Filed Sept. 1, 1959 6 Sheets-Sheet 5

Jan. 21, 1964 A. J. RADCLIFFE, JR., ETAL 3,118,974

ELECTRONIC SWITCHING TELEPHONE SYSTEM

Filed Sept. 1, 1959 6 Sheets-Sheet 6

United States Patent Office 3,118,974
Patented Jan. 21, 1964

3,118,974

ELECTRONIC SWITCHING TELEPHONE SYSTEM

Arthur J. Radcliffe, Jr., Orlando, Fla., and Thomas A. Pickering, Chicago, Ill., assignors to International Telephone and Telegraph Corporation, New York, N.Y., a corporation of Maryland Filed Sept. 1, 1959, Ser. No. 837,400
37 Claims. (Cl. 179—18)

This invention relates to telephone systems and more particularly to electronic switching telephone systems.

In the art of automatic telephony, switching equipment is operated to interconnect calling and called lines responsive to digit information which is indicative of the directory numbers of called lines. In the past, electromagnetic switching equipment has been used to interconnect telephone lines; however, such equipment has obvious disadvantages since the inertia of moving parts constitutes an inherent limitation to prevent increased switching speed and since the wear of moving mechanical parts presents maintenance and adjustment problems. In the more recent past, efforts have been made to overcome the limitations of electromechanical equipment by providing telephone systems which include electronic switching components. However, previously developed electronic switching systems have been large capacity systems that are adapted to give metropolitan type telephone service. Now, the problem is to provide for very small exchanges through the use of compact, easily transportable electronic switching equipment which gives reliable service despite rough usage.

An object of this invention is to provide new and improved electronic telephone switch systems.

Another object of this invention is to provide small capacity electronic telephone systems.

Yet another object of this invention is to provide highly reliable telephone systems.

Still another object of this invention is to provide electronic switching telephone systems having small capacity but including features which are regularly found in large capacity telephone systems.

In accordance with this invention, a telephone system is provided with a plurality of telephonic lines which are physically connected to spaced apart switching elements. A clock-like scanner device is provided for cyclically generating a plurality of signals which form time spaced control frames, each frame representing the directory number of a telephone line, a trunk line, a group of trunk lines, or the like. When a calling subscriber removes a handset or receiver, a seizure signal is sent over an associated subscriber line to a line circuit which is individual thereto. When the scanner generates pulses in a time frame representing the identity of the calling subscriber line, there is a coincidence in the line circuit between the time frame signal and the seizure signal thereby causing one of the spaced switching devices to operate and interconnect the calling line and central office telephone equipment. Thereafter, digital information may be transmitted from the calling subscriber line to the central office equipment. In the line circuit of the called line, there is a coincidence between a time frame which is representative of the identity of the called line and signals that are indicative of the digital information that is received. Responsive to such coincidence, another of the spaced switching elements operates thereby interconnecting the central office equipment and a called subscriber line. The two spaced switching elements are telephonically joined by any suitable link equipment. In this manner, a conversation connection may be completed on a spaced switching basis responsive to time spaced control signals.

The above mentioned and other objects of this invention together with the manner of obtaining them will become more apparent and the invention itself will be best understood by making reference to the following description of an embodiment of the invention taken in conjunction with the accompanying drawings in which:

FIG. 1 discloses a telephone system by block diagram and logic circuitry;

FIGS. 2–4 illustrate details of a telephone line link such as that shown generally in FIG. 1 as item 90;

FIG. 5 illustrates the manner in which FIGS. 2–4 should be joined to make a complete and understandable circuit.

Figure 1:
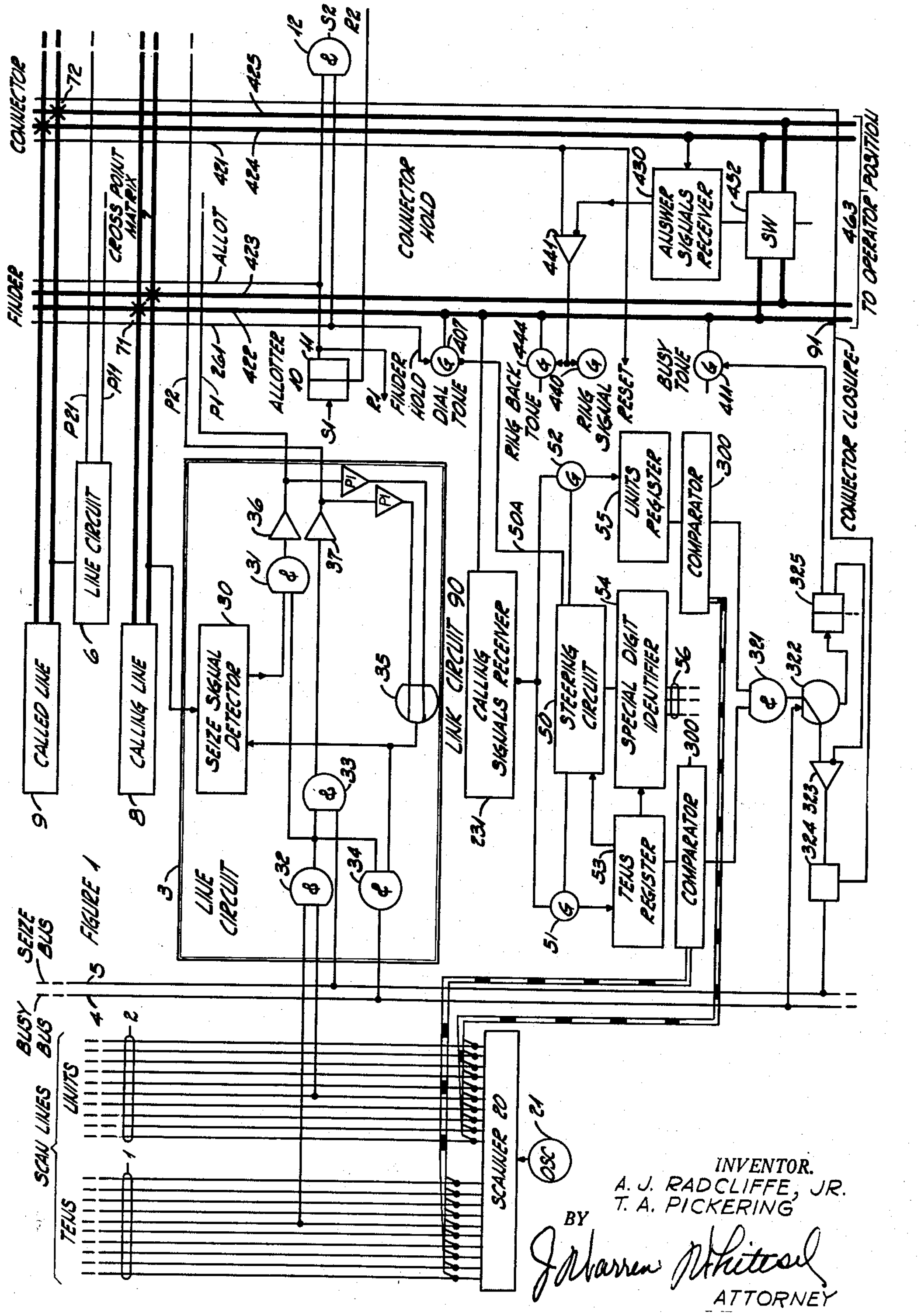
FIG. 1A is a series of pulse wave forms which depict the output of a scanner.
FIG. 1B is an explanation of the logic circuit symbols which are used in the remainder of the figures.
Figure 1A:
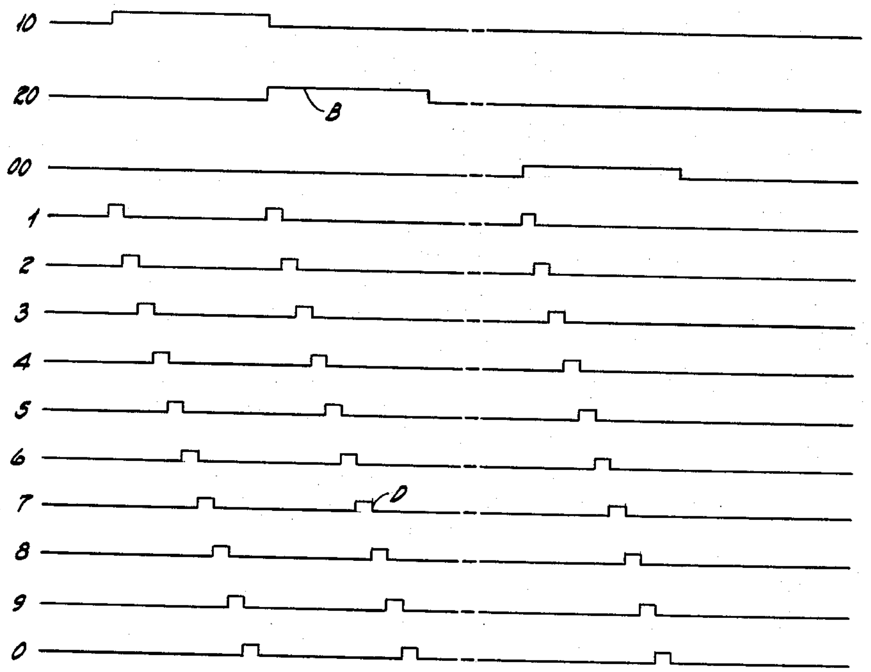
Figure 1B:
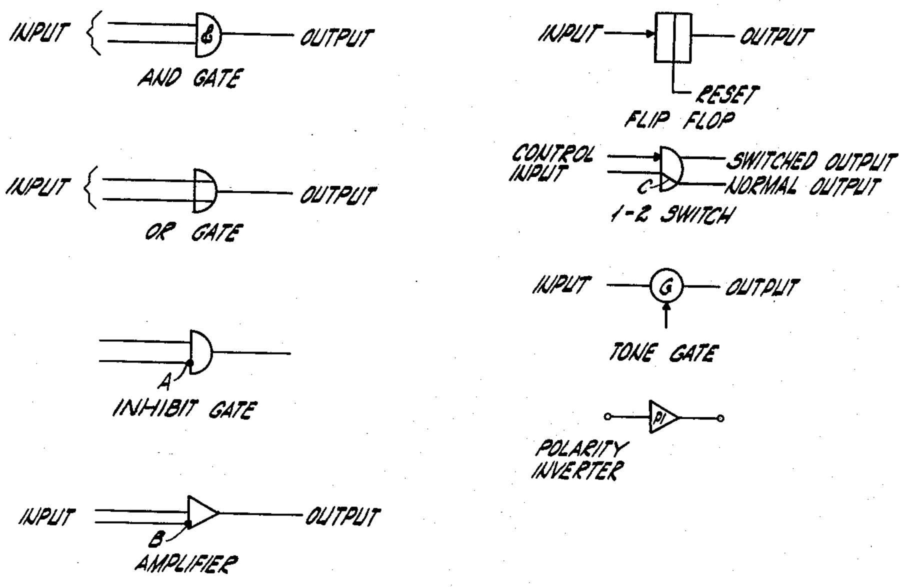

Reference is made to FIG. 1B for an explanation of the logic symbols which are used elsewhere in the drawings. An AND gate—shown by a half-circle including an ampersand—is a device which provides output signals only when input signals coincide at each input terminal. An OR gate—shown by a half-circle intersected by lines representing input conductors—is a device which provides output signals when any one or more of a plurality of input signals are present. An inhibit—shown by a heavily inked dot (such as items A and B) associated with an input terminal—provides means for blocking an output signal. It should be understood that similar heavily inked, inhibit indicating dots may be included with any of the other logic diagrams. A flip-flop—indicated by a bisected square—is a memory device which supplies an output signal responsive to an input signal applied to the terminal marked by an arrow head, thereby storing a memory of the input signal. The line bisecting the square indicates a reset circuit energization of which turns off the output signal, thereby storing a memory of the reset signal. A tone gate—shown by a circle including the letter "G"—responds to a control signal on the conductor marked by an arrow head by conducting any signals on an input conductor to an output conductor. A "1–2 switch" is a device which normally conducts all signals appearing on an input conductor across radial line "C" to the "normal output" conductor. When the control conductor—marked by an arrow head—is energized all input signals which are applied simultaneously therewith are switched from the "normal output" conductor to the "switched output" conductor. A polarity inverter provides an output pulse having a polarity which is opposite to the polarity of the input pulse.

While any suitable logic elements may be used to complete the circuits shown in the drawings, specific reference is made to a co-pending application by Arthur J. Radcliffe, Jr., entitled "Logic Circuits," S.N. 813,141, filed May 14, 1959. This co-pending Radcliffe application gives examples of logic circuit elements which may be used to provide the functions described in connection with the subject invention. Also, reference is made to a co-pending application entitled "Electronic Gate Circuit," S.N. 816,869, filed May 29, 1959, by T. A. Pickering as an example of the "1–2 switch" logic circuit element which is used in the subject application. Still further, reference is made to a co-pending application entitled "Electronically Controlled Crosspoint Switches," S.N. 826,805, filed July 13, 1959, by Frank S. Kasper and Leonard Lamin, for a description of the circuit details of a crosspoint switch which is suitable for use in connection with space switching matrix 7 of FIG. 1. Still another example of a suitable space switching crosspoint switch is found in a co-pending application entitled "Relayless Line Circuit and Call Distribution Systems," S.N. 749,240, filed July 17, 1958, by Radcliffe, Ribner and Sayner (now U.S. Patent No. 2,962,557). All of the above referenced co-pending applications—cited by way of example only—are assigned to the assignee of the subject case.

Where possible, simple terms are used and specific items are described hereinafter to facilitate an understanding of the invention; however, it should be understood that the use of such terms and description of such items are not to act in any manner as a disclaimer of the full range of equivalents which is normally given under established rules of patent law. For example, the line link 90 is shown as being individually associated with a vertical multiple in crosspoint matrix 7; whereas, much of the equipment in line link 90 may be common equipment which is shared by all vertical multiples in the crosspoint matrix. In a similar manner, a signalling code using two-out-of-five frequencies is shown; whereas, any suitable signalling methods such as loop dialing, polar duplex, etc. may be used. Again, a specific allotting scheme is shown by means of item 10; whereas, any suitable device may be used to assign idle links to serve a particular call. Quite obviously, other examples could be selected to illustrate the manner in which the terms that have been used and the items that have been described are entitled to a wide range of equivalents.

In the subject circuit, time division markings or frames are employed to control space switching elements. The term "time division switching" implies high frequencies which provide recurring time slots or frames, each of which represents a desired function, such as identification of a telephonic line, for example. The term "space switching" indicates that certain terminals are physically located or spaced away from other terminals and that switching consists of electrically interconnecting certain spaced apart terminals. The term "time frame" is used hereinafter to designate the manner in which a scanner applies control signals to cause space switching. For example, typical electromechanical systems use 100% space switching. Certain electronic switching systems rely on time division multiplexing whereby a plurality of voice channels are fitted into time frames on a single highway or speech channel—these electronic switching systems are usually 100% time switching. The subject circuit relies upon a mixture of the two concepts by providing time frames which control spaced switches.

*Brief Description*

Telephone lines are identified by time slots or frames which are defined by scanner pulses applied to tens and units scan lines 1 and 2 (FIG. 1). While the details of scanner 20 are not shown, any suitable device may be used, for example, the scanner may be thought of as a units counter which counts the out pulses of oscillator 21. After ten pulses are counted by a units counter, a tens counter is stepped. The interaction between the units and tens counters is somewhat like the motion of the hands of a clock wherein an hour hand is advanced one step responsive to each complete revolution of a minute hand.

In greater detail, the scan lines may be energized on a basis wherein a scanning cycle is completed every five hundred milliseconds. Each of the units lines is pulsed five milliseconds every 50 milliseconds. Each of the tens lines is pulsed 50 milliseconds every 500 milliseconds. As shown in FIG. 1A, a first tens line is marked for a 50 milliseconds period during which all ten units lines are pulsed. Thereafter, a second tens conductor is marked during a 50 milliseconds period while each of the units lines is pulsed. Once every 500 milliseconds, there is a coincidence between a marking on a tens conductor and a marking on a units conductor which identifies each line among 100 lines. For example, a coincidence between pulses B and D indicates the directory number 27.

When the instantaneous energization of two scan lines corresponds to a specific two digit directory number and when a calling signal is on a line having such number, an associated line circuit causes a space switching at an allotted crosspoint. When there is a coincidence between markings applied to the scan lines which identify a called line and a marking indicating that the line identified thereby is idle, a line circuit associated with such called line causes a space switching thereby interconnecting calling and called lines. The busy test is a function of markings applied to busy and seize busses 4 and 5. During each time slot corresponding to the directory number of a busy line, a pulse is applied to busy bus 4 by an associated line circuit. Assuming first that a marking is applied to busy bus 4 during a time frame which corresponds to markings applied to tens and units scan lines 1 and 2, tone gate 411 conducts to cause the transmission of a busy tone. Also, the inhibit terminal of amplifier 323 is energized to prevent an application of a seizure signal to seize bus 5. Responsive to an absence of signal on seize bus 5 the space switching in the crosspoint matrix is cancelled. In this manner, the called line is not seized and busy tone is returned to the calling subscriber in any well known manner.

If the called line is not busy, no pulse is applied to busy bus 4 during the time frame that identifies such line. In the absence of a busy marking pulse, amplifier 323 conducts and a marking is applied to seize bus 5 thereby causing line circuit 3 to close associated space switches to complete a connection via matrix 7.

*Detailed Description*

*Allotter operation.*—Frst, it is necessary to assign idle equipment to serve the next call that is received. The assignment is made by allotter 10 which is shown in the upper right-hand portion of FIG. 1. When the preceding link completes a certain switching function, any suitable means (not shown) marks conductor S1, thereby operating flip-flop 11 to provide an output signal which marks the conductor designated "ALLOT". Also responsive to the operation of flip-flop 11, a marking is returned over conductor R1 to cancel a previous allotment of a preceding idle link. As will be pointed out below, the marking on conductor "ALLOT" assigns a vertical multiple to serve the next call. After a linefinder crosspoint is closed in matrix 7, a signal is returned via finder hold conductor 261 to mark the lower input terminal of AND gate 12 which conducts to mark conductor S2. Responsive thereto, a flip-flop similar to item 11 but associated with the next idle vertical multiple conducts to assign such multiple and to mark conductor R2. Flip-flop 11 is reset responsive to a marking applied to conductor R2 whereupon the output signal formerly applied to conductor "ALLOT" is cancelled.

*Seizure.*—A call is placed when a subscriber removes a receiver or handset associated with the calling line to close hookswitch contacts (not shown) in any well known manner. Responsive thereto, any suitable means (not shown) transmits a seize tone of a particular frequency which is received by and conducted through tone detector 30 to AND gate 31. An AND gate—such as gate 32—associated with each line circuit in the exchange is connected to individual pairs among scan conductors 1 and 2. Scanner 20 sequentially applies marking potentials to scan lines 1 and 2 in a manner shown in FIG. 1A and described above. For example, an AND gate like gate 32 but associated with line 11 conducts when the first tens scan line and the first units scan line are marked simultaneously; and, a similar AND gate associated with line 12 conducts when the first tens scan line and the second units scan line are marked simultaneously; etc. Therefore, in each of the line circuits, an AND gate 32 produces a pulse which appears in the time slot or frame which identifies the line associated therewith.

A brief interval of time after the seize tone is detected by item 30, there is a coincidence between marked tens and units scan lines which identifies the calling line; whereupon a signal is transmitted through AND gate 32 to the lower input terminal of AND gate 31. At the input terminals of AND gate 31, there is a coincidence of calling or seizure signal and an enabling time frame signal. Therefore, AND gate 31 conducts.

Responsive to a signal at the output of AND gate 31, a marking is applied to conductor P1. A coincidence between the marking on conductor P1 and conductor "ALLOT" closes a space switching crosspoint in matrix 7 as explained in the above identified co-pending Radcliffe et al. and Kasper et al. patent applications. Incidentally, finder hold conductor 261 and connector hold conductor 421 are marked any time that an associated crosspoint is conductive. A connection is now extended from crosspoint 71 via conductors 422 and 423 to link circuit 90. It is within the scope of the invention either to provide one link circuit for each vertical multiple or to provide common links circuits which are shared by some or all vertical multiples. FIG. 1 shows a vertical multiple having an individual line link permanently associated therewith.

Responsive to the closure of crosspoints 71, a marking is applied to hold conductor 261 which turns-on gate 407 thereby applying dial tone to the heavily inked talking conductor 422.

*Dialing.*—Upon hearing dial tone, a calling subscriber at station 8 transmits a plurality of digit indicative signals identifying the directory number of the called line. The normal condition of steering circuit 50 is such that gate 51 steers the first or tens digit signals to be stored in tens register 53. After registration of a tens digit, a signal is transmitted from tens register 53 to operate steering circuit 50 thereby causing gate 51 to close or become non-conductive and causing gate 52 to open or become conducted.

Also responsive to operation of steering circuit 50, a marking is extended over conductor 50A to inhibit dial tone gate 407, thus removing dial tone.

Thereafter, the subscriber keys a second or units digit identifying the called line. This time, gate 52 is open and gate 51 is closed so that the units digit is stored in units register 55.

If the call is for a special purpose, as when an operator is called, for example, the first or tens digit controls identifier 54 and a special function is completed over conductors 56.

Scanner 20 is applying sequential marking potentials to associated tens and units scan lines 1 and 2 in the manner described above and shown in FIG. 1A. When there is a coincidence in comparator 300 between the signals stored in registers 53 and 55, and signals applied to scan lines 1 and 2, each of the comparators conducts a signal thereby triggering AND gate 321.

*Busy test.*—Next, a busy test is made to determine whether the called line that is indicated by the stored digits, is or is not busy. The results of the busy test are indicated by any suitable signals which are selectively applied to busy bus 4 and seize bus 5. For purposes of illustration, the signals are discussed below in connection with line circuit 3 as if it were the called line circuit 6 because circuits 3 and 6 are identical and the details are shown in circuit 3 only. Actually, the discussion should refer to called line circuit 6.

The manner in which scanner 20 marks scan lines 1 and 2 was explained above. Responsive to these markings and during the time frame which identifies the called line AND gate 32 conducts while comparator 300 detects indications stored in registers 53 and 55. The output of AND gate 32 is applied to the upper input terminal of AND gate 34 while comparator 300 causes AND gate 321 to apply an input signal to "1–2 switch" 322. The next circuit function depends upon whether the called line is busy or idle.

If it is assumed that the called line is busy, one of the conductors P1 or P2 is marked by means (not shown) which is located at the operated crosspoint in matrix 7. Responsive thereto, OR gate 35 conducts to mark the lower terminal of AND gate 34. There is a coincidence of signals which turns-on AND gate 34 thereby pulsing busy bus 4 and switching "1–2 switch" 322. Therefore, the output of AND gate 321 is switched from the upper input terminal of amplifier 323 to the operate terminal of flip-flop 325 which turns-on to remember the busy signal. The output of flip-flop 325 opens gate 411 to apply busy tone to talking conductor 422 and inhibits amplifier 323 to prevent switch through.

If it is assumed that the called line is idle, there is no closed crosspoint, conductors P1 and P2 are not marked, and OR gate 35 does not conduct. During the time slot or frame which indicates the called line, AND gate 32 conducts to mark the upper input terminal of AND gate 34, but gate 34 does not conduct since there is no marking at the lower input terminal thereof. Since gate 34 does not conduct, busy bus 4 is not marked during the time which is detected by comparator 300.

Since there is no pulse on busy bus 4 during the time frame which designates a called line, "1–2 switch" 322 is not switched and the signal from AND gate 321 is applied through circuits 322, 323 and 324 to seize bus 5. Hence, for the duration of the presently described time frame, the output of amplifier 323 is conducted over seize bus 5 through AND gate 33, amplifier 37 and conductor P2 to the connector crosspoints. Simultaneously therewith, circuit 324 applies a marking over conductor 91 which is also designated "CONNECTOR CLOSURE." Responsive to the connector closure and P2 markings, crosspoint 72 is fired. When crosspoint 72 fires, a marking is returned via conductor 421 and gates 441, 440 and 444 to cause the transmission of a ringing signal and ringback tone.

Means is provided for marking a line as busy immediately after crosspoints fire. That is, responsive to the output of AND gate 32 and OR gate 35 as explained above, AND gate 34 is triggered to apply a signal to busy bus 4.

As explained above, the foregoing description has treated line circuit 3 as both the calling and called line circuit. It should be obvious that line circuit 3 is associated with a calling line and that an identical line circuit 6 is associated with a called line. Therefore, it should be understood that when conductor P2 was described above, it was for illustrative purposes only. Actually, conductor P21, associated with the called line, is marked as described above.

Upon termination of the time frame that is individual to the called line, the signal that is transmitted through amplifier 323, seize bus 5 and conductor 91 is terminated.

*Answer supervision.*—It may be recalled that when the connector crosspoints 72 closed, a signal was returned over conductor 421 and through amplifier 441 to open gates 440 and 444 thereby transmitting ringback tone to the calling line and ringing signals to the called line. When the called subscriber answers, hookswitch contacts (not shown) are adapted to transmit seizure tone which is detected by receiver 430. Responsive thereto amplifier 441 is inhibited, thus terminating the signal which was applied to gates 440 and 444. When gates 440 and 444 close, the ringback tone and ringing signals are removed from the talking conductors. Also responsive to answer signal receiver 430, switchthrough gate 452 is rendered conductive to complete the talking circuit.

The conversation which is now in progress continues until the conversing subscribers return their receivers or handsets to a cradled position, thereby operating hookswitch contacts which send a release tone. Responsive to the receipt of release tone, switchthrough gate 452 opens to break the talking circuit. Thereafter, a signal (not shown in FIG. 1) is sent to release the crosspoint matrix.

*Description of Line Link*

The foregoing has been a general description of an electronic switching telephone system. Next, there will be a description of certain components which may be used to complete such a system. More particularly, the following is a description of the details of a typical link circuit such as item 90. It should be understood, however, that the link which is about to be described is cited by way of example only and that the principles incorporated therein may be modified to provide any desired function such as conversation timing, paystation detection, or the like.

Figure 3:
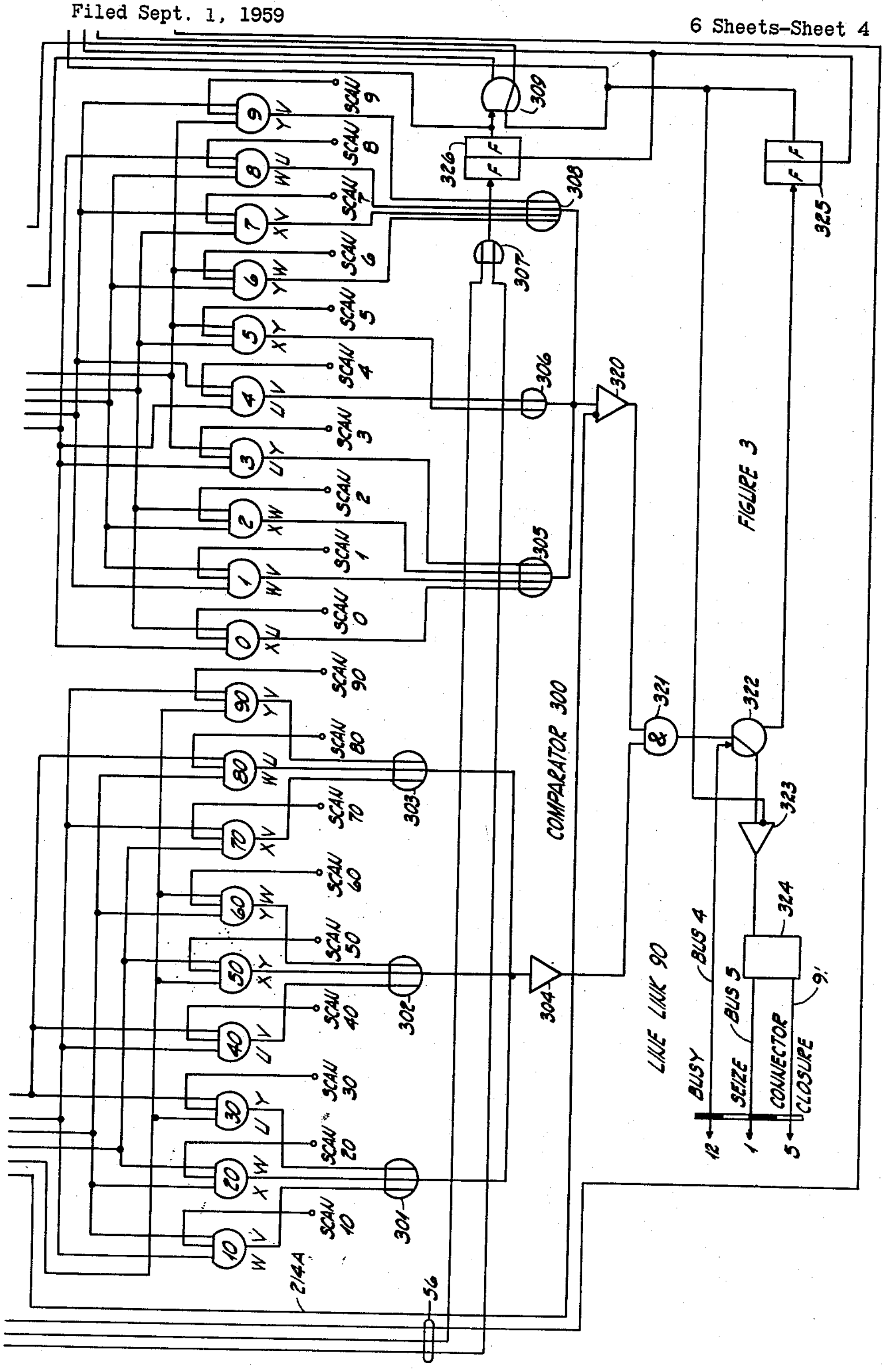
Figures 4, 5:
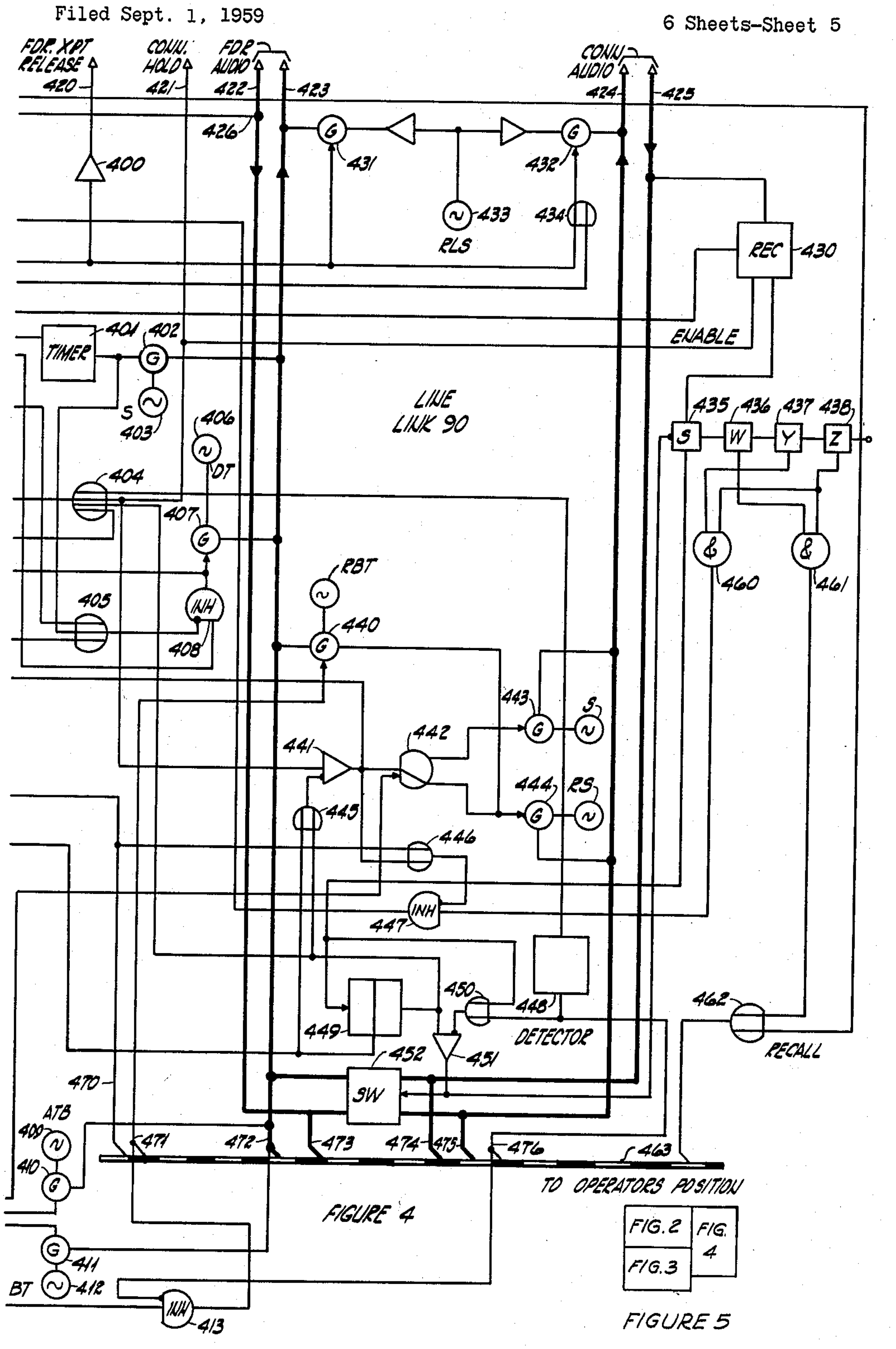

When the same component appears in FIG. 1 and in FIGS. 2–4, it is designated by the same reference numeral. The conductors shown in FIG. 1 which interconnect the matrix and the link also appear at the top of FIG. 4 except that finder hold conductor 261 is at the upper right-hand corner of FIG. 2 and conductor 91 appears in the lower left hand corner of FIG. 3. Two conductors which were not explained heretofore are connector crosspoint release conductor 260 and finder crosspoint release conductor 420. An application of a potential to either causes an associated crosspoint to release.

As explained above, when the calling subscriber removes a receiver or handset, an associated hookswitch operates thereby sending a seizure tone to an associated line circuit. Responsive thereto, crosspoints are closed at an allotted vertical multiple. When the crosspoints close, a potential is returned over finder hold conductor 261.

Responsive to the potential applied to conductor 261, a signal is transmitted over conductor 261A to prepare calling signals receiver 231. Also responsive to the signal return from the finder crosspoint switch over conductors 261, a start signal is sent to three minute timer 246. If no digit information is received from the calling subscriber within a three minute period following such start signal, the link and associated crosspoints are released by the timer. That is, after a three minute period, a potential is extended from timer 246 over conductor 246A to OR gate 243, amplifier 244, timer 245, amplifier 400 and conductor 420 to release the finder crosspoint. It is assumed, however, that digit information is received before the end of the three minute period. Also responsive to the holding potential returned from finder crosspoint over conductor 261, a circuit is extended through inhibit gate 408 to tone gate 407 which becomes conductive thereby transmitting dial tone from generator 406 to talking conductor 423.

The tens register (FIG. 2) is standing ready to receive digit information. In greater detail, flip-flop 211 is normally in a conductive state since a −12 volt control signal is applied to the input thereof. The output of flip-flop 211 is a steering potential which is transmitted over conductor 211A to an input terminal of each of the AND gates 221, 223, 225, 227 and 229. As will be explained later, the purpose of the steering potential is to direct the first digit information that is received to be stored in tens register 52.

*Digit storage.*—Next, it is assumed that the calling subscriber responds to dial tone by operating any suitable digit sending means for transmitting two-out-of-five tones. For example, a combination of two tone components may be sent from a key set at a calling subscriber station over conductors 422, 426, and receiver 231, to an analyzing circuit in the form of various filters U, V, W, X, Y and Z which separate the two components according to the frequency thereof, i.e. 1=W and V, 2=X and W, 3=U and Y, 4=U and V, 5=X and Y, 6=Y and W, 7=X and V, 8=W and U, 9=Y and V, 0=X and U, release=Y and Z, and recall=W and Z. Let it be assumed for the purposes of this description that the first or tens digit is the numeral 2 which is indicated by two tone components that are passed by filters X and W; therefore, conductors 239 and 240 are marked.

Means is provided for storing a digit indication only if two frequency components are received at the same time. For example, a transient on the line, a spurious signal, or the like might simulate one of the frequencies; however, it is very unlikely that two or more spurious signals having the exact digit frequencies will occur simultaneously. Steering circuit 50 is applying a potential over conductor 211A to mark a first input terminal of each AND gate of tens register 52. A second terminal of AND gate 227 is marked responsive to one tone component by a potential applied via conductor 240 when the subscriber keys the digit 2. If any other digit indicating tone component is being received, it causes a marking to appear on one of the other conductors of group 237–241. More specifically, since it has been assumed that the first digit indication which is received consists of frequencies X and W, a potential on conductor 239 biases OR gate 235 to conductivity. The output of gate 235 is applied to provide a coincidence of three signals at the input terminals of AND gate 227 which, therefore, conducts and triggers flip-flop 226. If a single, spurious frequency is received, OR gate 235 does not conduct, there is no coincidence of three signals at the input terminals of AND gate 227, and nothing is registered in flip-flop 226.

The second tone component, "W," which is assumed to be transmitted as part of the tens digit causes a marking on conductor 239 which is connected to the central input terminal of AND gate 225. Since conductor 240 is marked by the "X" frequency, OR gate 234 begins to conduct, and a marking is applied to the upper input terminal of AND gate 225. Since the lowermost input terminal of AND gate 225 is marked by the steering potential applied via conductor 211A, AND gate 225 conducts and operates flip-flop 224, thereby registering the second frequency that is used to identify the numeral "2." Hence, it is seen that a first analyzed control signal has been stored in the tens register.

Means is provided for detecting when a calling subscriber releases the digit key which was depressed to transmit a tens digit, as described above. Responsive to such detection, the tens register is decoupled and the units register is coupled to store a digit indication. Otherwise, a marking may be stored in the units register in accordance with the tens digit. Thus, output signals from flip-flops 224 and 226 mark conductors 224A and 226A thereby causing OR gate 200 to conduct. It may be noted that OR gate 200 has four input terminals which may be marked by any of the frequencies V–Y. There is no need to provide OR gate 200 with five input terminals since two frequencies are always present before a digit is registered, therefore, the presence of any digit may be detected responsive to the presence of one or more of any four frequencies. An output signal from OR gate 200 is normally sufficient to cause flip-flop 210 to conduct; however, the dot shown at the reset terminal of flip-flop 210 indicates that a potential applied to this terminal inhibits the flip-flop and prevents it from conducting. As was pointed out previously, each of the OR gates 232–236 is rendered conductive by any four of the digit frequencies U–Y. Therefore, any two of the OR gates 232–236 provides sufficient capacity to detect all of the five component frequencies U–Y. Thus, if any of the five tone component frequencies U–Y is present, either or both of the OR gates 232 and 233 conducts, thereby transmitting a signal through OR gate 214, inhibit gate 212, and OR gate 213 to the inhibit terminal (the heavily inked dot) of flip-flop 210. Thus, flip-flop 210 does not conduct if any of the tens digit indicating frequencies U–Y is present.

When a calling subscriber releases the digit key which was depressed to transmit a tens digit, the digit frequencies U–Y are removed and OR gates 232 and 233 cease to conduct; therefore, the inhibit signal is removed from flip-flop 210 which begins to conduct responsive to the output of OR gate 200.

When flip-flop 210 conducts, the output thereof is connected to the reset terminal of flip-flop 211, thus biasing it to its non-conductive state. The output of flip-flop 210 is also applied to the upper inhibit terminal of gate 212, thus blocking further control of flip-flop 210 from gate 212. Also responsive to the output of flip-flop 210, conductor 210A is marked thereby transmitting a steering potential to the units register.

Responsive to the reset of flip-flop 211, the steering potential is removed from conductor 211A, thereby blocking further control of the tens register. The circuit is now standing ready to receive the units digit and nothing further happens until it is received.

It is assumed that the calling subscriber keys the digit 7 which is indicated by a simultaneous transmission of tone components having V and X frequencies over conductors 422, and 426 to receiver 231. Filters V and X provide analyzing means which passes the digit indicating frequencies to mark conductors 238 and 240. The marking on conductor 238 is applied to the central input terminal of AND gate 223A. The steering potential applied to conductor 210A marks the lower input terminal of AND gate 223A while OR gate 233 conducts responsive to the presence of the X frequency markings on conductor 240, thereby marking the upper input terminal of AND gate 223A. The coincidence of three signals at the input of gate 223A causes it to conduct and operate flip-flop 222A to its conductive state. The X frequency markings on conductor 240, the steering potential on conductor 210A, and the output of OR gate 235 coincide at the input terminals of AND gate 227A to turn-on flip-flop 226A.

Briefly, in résumé, the tens digit was represented by the X and W frequencies which turned-on flip-flops 226 and 224 respectively. The units digit was represented by the V and X frequencies which turned-on flip-flops 222A and 226A respectively. If the output circuits of flip-flops 226 and 224 are traced, it is found that there is a coincidence at two of the input terminals of the "20" AND gate of comparator 300. If the output circuits of flip-flops 222A and 226A are traced, it is found that there is a coincidence at two of the input terminals of the "7" AND gate of comparator 300. Hence, the directory number "27" has been registered.

As explained, scanner 20 of FIG. 1 is applying pulses to provide a plurality of time frames such as those shown in FIG. 1A, i.e. two of the scan conductors are always marked simultaneously. The output of the scanner is also connected to the scan terminals of comparator 300, FIG. 3. When the scan terminal of tens gate 20 is marked, gate 20 conducts owing to the coincidence of the markings that are transmitted from tens register 52 as described above. The output signal from gate 20 of comparator 300 causes OR gate 301 to become conductive. When the scan terminal of gate 7 is marked during the second tens time frame, AND gate 7 of comparator 300 is turned on whereupon OR gate 308 begins to conduct.

Means is provided for detecting when the units sending digit key is released. As explained above, in connection with the transmission of a tens digit, if any digit indicating frequencies are present, either gate 232 or gate 233 conducts to turn-on gate 214. Inhibit gate 212 does not conduct at this time since its upper inhibit terminal is marked by the output of flip-flop 210. When gate 214 turns-on, a signal is transmitted over conductor 214A to the left-hand or inhibit terminal of amplifier 320, thus preventing conductivity through amplifier 320. When the key used to transmit the units digit signal is returned to normal, OR gates 232 and 233 cease to conduct; therefore, the inhibit signal is removed from the left-hand input of amplifier 320. The next time that the scanner marks terminals 20 and 7 in comparator 300, OR gates 301 and 308 are rendered conductive, thus simultaneously marking AND gate 321.

*Busy test.*—Referring to FIG. 1 briefly in résumé, it may be recalled that scanner 20 marks "tens" and "units" conductors 1 and 2 as shown in FIG. 1A. There are sequential coincidences in time which provide time frames, each of which indicates the directory number of an associated line. Since it has been assumed that the number "27" was keyed, a simultaneous marking on the second tens conductors and seventh "units" conductor occurs simultaneously with the marking applied to the "20" scan terminal and the "7" scan terminal in FIG. 3. The markings applied to the scan lines (FIG. 1) cause AND gate 32 to conduct. The output signal of AND gate 32 is applied to an input terminal of AND gate 34. If the line associated with line circuit 3 is busy, a marking on either of the sleeve conductors P1 or P2 is extended through OR gate 35, to the lowermost input terminal of AND gate 34. Thus, it is seen that AND gate 34 is rendered conductive at a time when scanner 20 is indicating the director number of a busy called line. An output signal from gate 34 is, therefore, applied to busy bus 4 by each busy line circuit during the time frame that represents such line circuit.

Referring to FIG. 3, the busy bus 4 is connected to the control terminal of "1–2 switch" 322. If a busy pulse occurs simultaneously with the marking applied to scan lines 20 and 7, it is an indication that the called line "27" is busy. Thus, "1–2 switch" 322 is operated to transmit the output signal of AND gate 321 to the input terminal of flip-flop 325 which responds by flipping to its conductive state. Responsive thereto, "1–2 switch" 309 and gate 411 are energized, thus extending busy tone from generator 412 through gate 411 to the heavily inked talking conductor 423. Normally, the calling subscriber hears busy tone and hangs-up. The output signal of flip-flop 325 is also applied through OR gate 247 to start three minute timer 246. If the calling subscriber does not hang-up before the end of a three minute period, conductor 246A is marked, gates 243, 244, and 245 are rendered conductive, and conductors 260 and 420 are marked, thus releasing any crosspoints which may be conductive. Also responsive to the output signal of flip-flop 325, an inhibit terminal associated with amplifier 323 is marked, thus preventing the transmission of a seize signal to bus 5.

*Idle line.*—Next, it is assumed that the called line is idle when a busy test is made. Referring to FIG. 1, scanner 20 marks a "tens" conductor and a "units" conductor to provide a time position representing the directory number of the called line. Gate 32 conducts and applies a signal to the upper input terminal of AND gate 34. Since the called line is idle, neither conductor P1 nor conductor P2 is marked; therefore, gates 35 and 34 do not conduct and no pulse is applied to busy bus 4 during the time slot which is representative of the called subscriber line.

Referring next to FIG. 3, since there is no pulse on the busy bus 4 when AND gate 321 conducts during the time slot of the called line, electronic "1–2 switch" 322 is not triggered to operate flip-flop 325; rather, the output signal of switch 322 is extended through amplifier 323 to mark seize bus 5 and to mark conductor 91.

Referring again to FIG. 1, a pulse on seize bus 5 during the time slot which indicates the directory number of the called line causes AND gate 33 to conduct, thus marking conductor P2, as explained above in connection with the description of FIG. 1. Therefore, a crosspoint switch is operated in the connector matrix at intersection 72 of the marked P2 conductor and the vertical "CONNECTOR CLOSURE" conductor 91.

*Ringing.*—Next, it is necessary to transmit ringing current to signal the called subscriber and ringback tone to inform the calling subscriber of the fact that the called line is being rung.

When the connector crosspoint closes, any suitable means (not shown) applies a potential to conductor 421 thereby turning-on OR gate 404. A signal is extended through amplifier 252 to reset each of the flip-flop circuits in the tens and units registers and to inhibit flip-flop 210. When flip-flop 210 is inhibited, flip-flop 211 once again begins to conduct responsive to the −12 volt battery potential which is normally applied to the input terminal of flip-flop 211. Thus, the registers are cleared. Also responsive to the marking applied to conductor 421 by the operated connector crosspoint switch, an enabling signal is transmitted to prepare receiver 430 for the receipt of answer supervision. Furthermore, the marking on conductor 421 is extended through amplifier 441, and electronic "1–2 switch" 442 to cause tone gate 444 to apply ringing signal RS to conductor 424 for signalling the called subscriber and to cause tone gate 440 to apply ringback tone RBT to conductor 423 for signalling the calling subscriber.

A bell or other signal at the called subscriber station is operated in any well known manner responsive to signal current from generator RS.

*Answer supervision.*—Nothing further happens until the called subscriber answers at which time his hookswitch (not shown) momentarily causes the transmission of a frequency which energizes receiver 430 and the "S" filter 435, flip-flop 449 and OR gate 450. The output signal of OR gate 450 inhibits amplifier 451, thus preventing the transmission of an output signal from flip-flop 449 to switch through gate 452.

Responsive to the output of flip-flop 449, a signal is extended through an input terminal of OR gate 404 to reset flip-flops in the tens and units registers, if not previously reset. Also responsive to the output signal of flip-flop 449, OR gate 445 is turned-on to inhibit amplifier 441. When amplifier 441 ceases to conduct, tone gates 440 and 444 close, thereby removing the ringback tone and ringing signal which had been transmitted over the line before the called party answers.

A brief period of time after the receipt of answer supervision, the "S" frequency or seizure signal automatically terminates, thus ending the signal which was transmitted from filter 435 through OR gate 450 to inhibit amplifier 451. Removal of the inhibit signal causes amplifier 451 to conduct responsive to the output signal of flip-flop 449. When amplifier 451 begins to conduct, gate 452 closes to switch through the talking circuit. Also responsive to the output signal of amplifier 451, the inhibit terminal of filter 435 is energized thereby preventing any response to "S" frequencies which may occur during conversation.

*Release.*—A conversation is now in progress, and nothing further happens until either the calling or the called subscriber hangs-up. Although the circuit shows release under the control of the first party to hang-up, it should be obvious that the circuit my be arranged to release under the control of either or both conversing subscribers. The hookswitches of the subscriber stations are adapted to send a release signal consisting of Y and Z frequencies when a receiver or handset is placed on-hook. If the calling subscriber hangs-up first, Y and Z frequencies are transmitted over conductors 422 and 426, to receiver 231 and filters Y and Z associated therewith. Responsive to signals transmitted through the Y and Z filters, AND gate 242 conducts thereby applying a signal to OR gate 243, amplifier 244, and a timer 245. For a period of time which is determined by the characteristics of timer 245, a signal is applied to conductor 260 for releasing the operated connector crosspoint and to conductor 420 for releasing the operated finder crosspoint. A signal is also transmitted from timer 245 through OR gates 251 and 404 to reset flip-flops in the tens and units register, as described above. Also responsive to the output of timer 245 a signal is transmitted through amplifier 263 to reset flip-flops 449, 325, and 326. Moreover, the output of timer 245 causes gates 431 and 432 to open for a brief interval during which release tone RLS is sent from generator 433 over the talking conductors 422–425 to operate any equipment adapted to respond thereto. For example, certain trunk equipment used in a long distance call may be released responsive to such signal. All equipment that was used during the call is released at this time.

If it is assumed that the called subscriber hangs-up first, the Y and Z frequencies are transmitted through receiver 430 and the Y and Z filters associated therewith; whereupon, AND gate 460 is rendered conductive. Responsive thereto, a signal is transmitted through inhibit gate 447 or OR gate 243. The remaining circuit functions are the same as those described above in connection with the calling party release.

*Level Marking*

In the art of automatic telephony, it is sometimes necessary to treat particular calls in a special manner. For example, there may be conversation timing during certain calls, there may be restrictions during other calls, and equipment may absorb digits during still other calls. It is conventional to group lines requiring the same functions and to provide means for identifying the grouping. In older forms of telephone equipment the lines were grouped into "levels" and the identifying means was called "level marking." The term "level marking" is used hereinafter to indicate markings which identify particular call functions without regard as to the physical connections of the lines. The above cited and many other functions may be performed selectively responsive to level markings.

Means is provided in the form of AND gates 201–204 to give level markings which may be utilized to perform special functions either responsive to a single digit or responsive to a plurality of digits. The particular level markings which are shown by the drawing are for illustrative purposes only. For example, although it is not shown, the output signal of a level marking AND gate such as 202 may be extended through an AND gate (not shown but controlled jointly by flip-flop 449) to the start conductor of three minute timer 246, thereby providing conversation timing. In a similar manner, the output of an AND gate such as 202 may be connected by a circuit which is not shown to the input of gate 404, thereby providing a drop back or digit absorbing function. As was pointed out above, the level markings derived from AND gates 201–204 may perform any desired functions; however, the specific level markings which are shown in the drawings are adapted to extend calls to an operator position responsive to a single digit, to one of many trunk lines responsive to a single digit, or to a particular trunk line responsive to two digits.

*Call to operator.*—Means is provided for extending a call to an operator position responsive to the receipt of a zero digit indication in the "tens" position. That is, if the first digit to be sent is the digit zero, a U frequency and an X frequency is received and responsive thereto information is stored in the tens register as explained above. Flip-flops 220 and 226 are turned-on by the U and X frequencies respectively. Responsive thereto, gate 201 becomes conductive and applies a signal through inhibit gate 413 to control tone gate 440 thereby transmitting ringback tone from generator RBT to the calling subscriber via conductor 423. Also responsive to the output of inhibit gate 413, a signal is transmitted over conductor 471 and cable 463 to an operator position where any suitable device responds to give a call indicating signal.

When the operator answers, any suitable means (not shown) applies a potential over conductor 476 to the inhibiting input terminal of gate 413 to block the transmission of the control signal applied to gate 440 and thereby terminate the transmission of ringback tone. Also responsive to the potential applied to conductor 476, a signal is transmitted through detector 448 to OR gate 404 which resets the flip-flops in the register. As long as the signal remains on conductor 476 amplifier 451 is inhibited and gate 452 is non-conductive. The operator talks to the calling party via conductors 472, 473, 422 and 423.

The operator may talk to a called party, if any, over conductors 474, 475, 424 and 425. When the operator removes the signal from conductor 476, amplifier 451 is no longer inhibited. If a called party has answered and flip-flop 449 is conductive, gate 452 becomes conductive and the talking conductors are switched through. Thereafter, the conversing parties may talk to each other.

The operator may release a connection by applying a proper signal to conductor 470 whereupon the circuit functions as described above in the section entitled "Release."

*Trunk call.*—Means is provided for causing a special function responsive to registering a single digit in both the tens and units register thereby permitting a call to be extended responsive to a single digit. In greater detail, if it is assumed that either the numeral 7 or the numeral 9 is stored in the tens register, OR gate 205 begins to conduct thereby marking the lower or inhibit terminal of gate 212. When gate 212 is inhibited, it blocks the signal which is normally applied for the duration of a tens digit indication through OR gate 213 to the inhibit terminal of flip-flop 210 to prevent the storage of the same digit in both the tens and units register. Since flip-flop 210 begins to conduct immediately after storage of a tens digit, a steering potential is applied to conductor 210A and the tens digit is immediately stored in the units register. Thereafter, the circuit functions in the manner that was described above in connection with the receipt of two digits.

On the other hand, if a trunk is to be seized responsive to two digits, the numeral 8 is received, and gate 202 conducts; however, there is no path leading from gate 202 to an inhibit terminal of gate 212. Signals passed by gate 212 block the output of flip-flop 210 until the end of the tens digit.

Regardless of the level to which a trunk call is extended, the output signal of AND gates 202–204 is connected either directly or through OR gate 205 to OR gate 307. Responsive to the output of OR gate 307, flip-flop 326 is operated to remember that a trunk call is in progress. The output of flip-flop 326 is connected to the control terminal of "1–2 switch" 309 which is operated to cause an all-trunks busy tone to be sent from generator 409 through gate 410 if a busy condition is encountered, the busy test being made as explained above. Also responsive to the output of flip-flop 326, "1–2 switch" 442 is operated to send a seizure signal through gate 443 instead of a ringing signal through gate 444. The seizure signal is effective for controlling equipment connected to the distant end of a trunk line.

*PBX Trunk Hunting*

Figure 6:
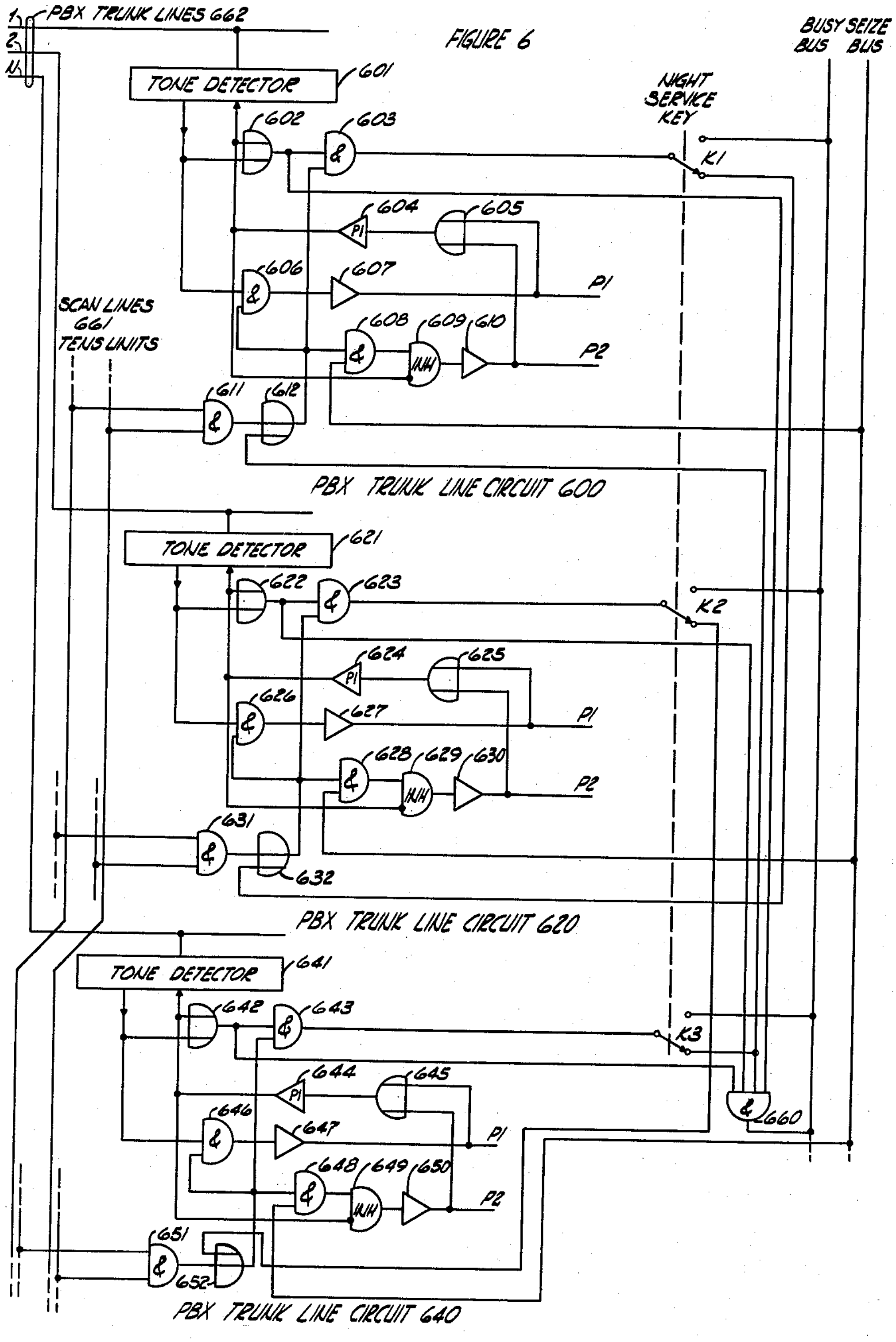
FIG. 6 illustrates a PBX trunk hunting feature.

FIG. 6 shows a PBX trunk hunting scheme which is included herewith to provide a complete understanding of the subject telephone system. The trunk hunting features are claimed in a co-pending application entitled "PBX Trunk Hunting in Electronic Switching Telephone System," S.N. 854,496, filed November 20, 1959, by Kasper, Pickering, Arsenan and Maxa (now U.S. Patent No. 3,038,969). Kasper et al. is assigned to the assignee of the subject case.

Means as provided for searching over a plurality of trunk lines responsive to the receipt of a directory number which indicates a group of PBX trunks 662. FIG. 6 shows the details of three PBX lines and associated circuits, the last line being labeled "N" to indicate any number of telephonic lines may be accommodated.

Briefly, in the subject telephone system each line has an individually associated line circuit. The subscriber lines, such as lines 8 and 9 (FIG. 1), may be identified by individual directory numbers. On the other hand, a single directory number may identify a private branch exchange that has a group of incoming trunks. Calls to such private branch exchanges may be extended over any idle line in the group of trunks—it makes no difference which trunk is used during any particular call. As will be explained in greater detail below, during a time frame which indicates a PBX trunk group, AND gate 660 applies a pulse to the "BUSY BUS" if all lines in the PBX group are busy. If any line is idle, the associated link applies a pulse to the "SEIZE BUS" as explained above in connection with line circuit 3 and link circuit 90. Thereafter, if idle, first line circuit 600 of a PBX group is seized to extend the call. If circuit 600 is busy, it passes a marking from the output of AND gate 603 to the input of OR gate 632 in circuit 620. If line circuit 620 is busy, it passes a marking from the output of AND gate 623 to the input of OR gate 652 in the line circuit 640. In this manner, each line circuit in the PBX group is enabled until an idle line is found, at which time the call is extended over such idle line.

In greater detail, when an incoming call is extended over a trunk line in group 662—trunk 1, for example—a seizure tone is transmitted to detector 601 thereby turning-on OR gate 602 and marking the uppermost terminals of AND gates 603 and 606. Also responsive to the output signal of OR gate 602, a marking is extended to one of the input terminals of busy marking AND gate 660.

Later, during a time frame which is indicative of the PBX trunk group, simultaneous markings are applied to the tens and units scan conductors 661 to which AND gate 611 is connected. Responsive thereto, AND gate 611 applies an input signal to OR gate 612 which conducts. The marking applied by OR gate 612 to the upper input terminal of AND gate 608 has no effect at this time. The lower input terminal of AND gate 606 is marked by the output signal of OR gate 612. Since a seizure tone signal marks the upper input terminal of AND gate 606, there is a coincidence at the input terminals thereof. Responsive thereto, gate 606 conducts and a marking is applied through amplifier 607 to conductor P1, thus closing finder crosspoints as explained above in connection with FIG. 1. Also responsive to the output of AND gate 606, a signal is applied to an input terminal of OR gate 605 thereby returning a marking through polarity inverter 604 to tone detector 601 and to inhibit gate 609 for preventing further response in line circuit 600.

Incoming calls are fairly simple since a trunk line is not seized at the distant end unless it is idle; however, outgoing calls are a little more complex since the same directory number may cause any one of a number of trunk lines to be seized, depending upon the idle or busy conditions thereof.

As explained above, a directory number representing a first PBX line is dialed into the register of a link circuit such as line 90 and, at an appropriate time, a busy test is made. If any trunk line in a PBX group is idle, a pulse is applied to the "SEIZE BUS" conductor during each time frame which indicates a PBX line.

A coincidence of markings applied to the tens and units scan conductors causes AND gate 611 and OR gate 612 to become conductive. The output signal of OR gate 612 coincides at the input terminals of AND gate 608 with a seize signal extended over the "SEIZE BUS." Responsive thereto an output signal from AND gate 608 is extended through inhibit gate 609 which is either opened or closed depending upon whether the trunk line individually associated with line circuit 600 is or is not busy. If it is assumed that the trunk line is not busy, the output of AND gate 608 is extended through inhibit gate 609 to conductor P2 thereby causing a crosspoint in a connector matrix to close as explained above. If it is assumed that the trunk line associated with line circuit 600 is busy, a signal is extended from either the P1 conductor or the P2 conductor through OR gate 605 and inverter 604 to mark tone detector 601 and to inhibit gate 609. Therefore, the output of AND gate 608 is blocked and no marking is extended over the P2 conductor which is associated with a first trunk in the PBX group. Also responsive to the busy marking applied through polarity inverter 604, OR gate 602 conducts and applies a signal to an input terminal of AND gate 660. The output signal of OR gate 602 energizes the upper input terminal of AND gate 603.

During the time frame which is being described, the lower terminal of AND gate 603 is energized responsive to markings applied to the scan conductors. Therefore, an output signal from AND gate 603 is fed into an input terminal of OR gate 632 which is associated with line circuit 620, thereby seizing a second PBX line during the time frame that is individual to a first PBX line. Responsive to the output of OR gate 632, a signal is fed through AND gate 628 while the seize bus is being marked from an associated link. Thus, a P2 conductor which is individual to the second trunk line circuit 620 is marked to control a connector crosspoint. However, if line circuit 620 is busy, an inhibit signal is applied from a "P" conductor through OR gate 625 to block inhibit gate 629 thereby preventing operation of connector crosspoints. Moreover, at AND gate 623, the marking extended from a busy "P" conductor coincides with a marking extended through OR gate 632; hence, the call indicating signal is passed from the output terminal of AND gate 623 to an input terminal or OR gate 652, thereby seizing line "N" during the time frame that represents line 1. In this manner, each line circuit in the PBX trunk group is successively enabled to seize the trunk line associated therewith if such line is then idle.

If a directory number indicating line 2 is dialed, line circuit 620 is tested first; if busy, the output of AND gate 623 enables OR gate 652. If circuit 640 is busy, the output of AND gate 643 is applied to an input terminal of OR gate 612, etc. In this manner, there is PBX trunk hunting without regard to which individual PBX line is identified by the directory number which is dialed.

When all PBX trunk lines are busy, signals are applied to three input terminals of busy marking AND gate 660 by OR gates 602, 622, and 642. The fourth input terminal of AND gate 660 is used to complete the chain when all PBX lines are busy. Since all input terminals of AND gate 660 are now marked, a busy indicating potential is applied to the busy bus during all time frames which are indicative of any line in a PBX trunk group.

*Night service.*—Each line circuit is connected to be individually enabled by a different one of the time frames—as indicated in FIG. 6 by the fact that each of the AND gates 611, 631, and 651 connects to different scan conductors. During periods of normal PBX service, subscribers are instructed to dial a directory number that indicates line circuit 600, and all line circuits in the PBX group are successively enabled (as explained above) during the time frame representing the first line circuit in the PBX group until an idle trunk is found. During periods when there is no PBX trunk hunting, night service keys K1–K3 are switched. During periods of night service, calling subscribers are instructed to dial the directory numbers which identify individual lines in the PBX group. When keys K1–K3 are switched, the outputs of AND gates 603, 623, and 643 in busy line circuits are applied to the busy bus and the busy marking signal is not passed on to cause trunk hunting. In this manner calls may be directed to individual trunks in the PBX group during periods of night service.

While the principles of the invention have been described in connection with specific apparatus, it is to be clearly understood that this description is made only by way of example and not as a limitation on the scope of the invention.

We claim:

1. A telephone system comprising a plurality of spaced apart switching elements for extending speech paths through said system, said spaced apart elements being divided into groups, a plurality of links for controlling said elements, each of said links being individually associated with a corresponding one of said groups, means for generating a plurality of time frames, each of said time frames identifying corresponding switching elements in each of said groups, means for selectively controlling one of said spaced switching elements responsive to control signals appearing in time frames corresponding to said controlled spaced switching element, means responsive to said control of said switching element for extending voice path connections from said controlled switching element to the one of said links which is individually associated with the group to which said controlled switching element belongs and voice gate means in said one link for completing a speech path from one of said elements through said one link to another of said elements.

2. The telephone system of claim 1 and means associated with said one link for storing control information which identifies certain of said spaced switching elements, means in said one link for comparing said time frames with said stored information, means responsive to detection of time frames indicated by said stored information for selectively controlling other of said spaced switching elements in said one of said groups with which said one link is individually associated.

3. The telephone system of claim 1 and means associated with said one link for storing control information which identifies certain of said spaced switching elements, means in said one link for comparing said time frames with said stored information, means responsive to detection of time frames indicated by said stored information for making a busy test to determine the idle or busy condition of equipment associated with other of said spaced switching elements, means for selectively controlling said other switching element to extend a connection responsive to an idle test indication, and means for blocking said extended connections and returning busy tone responsive to a busy test indication.

4. A telephone system comprising a plurality of spaced switching elements, said spaced elements being divided into groups, a plurality of links each being individually associated with a corresponding one of said groups, means for generating a plurality of time frames, each of said time frames identifying corresponding switching elements in each of said groups, means individually associated with each of said links for storing digit information which identifies certain of said spaced switching elements, said storing means comprising means for detecting digit indicating tones which are transmitted via said spaced switching elements, a tens register, first gate means for selectively registering certain digit indications in said tens register, a units register, a second gate means for selectively registering other digit indications in said units register, means responsive to termination of said certain digit indications for closing said first gate and opening said second gate thereby switching from said tens register to said units register, means in said links for comparing said time frames with said storing information, and means responsive to detection of a time frame identified by said stored information for selectively extending connections through said spaced switching elements.

5. The telephone system of claim 4 and means responsive to particular ones of said certain digit indications for immediately closing said first gate and opening said second gate thereby registering the same digit in both said tens and units registers.

6. Control means for operating spaced apart switching elements of an automatic telephone system comprising means for registering information signals, means for providing a plurality of cyclically recurring time frames, means for comparing said registered information signals with said recurring time frames, means responsive to said comparing means for detecting a particular one of said time frames, and means for directing said automatic telephone system to extend calls through at least one of said spaced apart switching elements during said detected time frame.

7. The control means of claim 6 wherein said register means comprises a plurality of AND gates each having at least two input terminals associated therewith, means for normally applying a steering signal to a first input terminal of each of said AND gates in a first group of said AND gates, means for applying signals to the other of said input terminals of at least a selected one of said AND gates in said first group of said AND gates in accordance with the characteristics of first information signals, means responsive to said first information signals for switching said steering signal from said first group of said AND gates to a first input terminal of each of said AND gates in a second group of said AND gates, and means for applying signals to the other of said input terminals of at least a selected one of said AND gates in said second group of said AND gates in accordance with the characteristics of second information signals.

8. The control means of claim 7 wherein each of said AND gates has three input terminals, each of said information signals comprises two tone components, said means for applying signals to said other terminals of said AND gates comprises means for selectively applying one of said tone components to a corresponding one of said AND gates, and means for marking a third input terminal of said AND gates if any other of said tone components is present whereby each AND gate conducts only if two tone components and a steering signal are present.

9. The control means of claim 8 wherein each of said information signals represents a digit, each of said tone components is a distinctive frequency, and said means for applying signals to said other terminals comprises a plurality of filters each being adapted to pass one of said frequencies.

10. The control means of claim 7 and means for detecting certain of said first information signals, means responsive to said detection of said certain first information signals for causing said means for switching said steering signals to operate before the termination of said first information signals, and means responsive to said last named means for storing the same information signal in both of said groups of AND gates, whereby said control means responds to the receipt of one information signal when said certain signals are indicated and responds to the receipt of two information signals when other signals are indicated.

11. In a telephone system, means comprising a plurality of registers for storing digit information, each of said registers comprising means for detecting particular frequencies and a plurality of AND gates each having first, second, and third input terminals, each of said AND gates being individually associated with corresponding ones of said frequency detectors, means for applying a steering potential to the first input terminal of each AND gate associated with a first of said registers, means for individually connecting the output of each of said detectors to the second input terminal of corresponding ones of said AND gates, means for group connecting the outputs of all except said corresponding detectors to the third of said input terminals, whereby said AND gates conduct responsive to a coincidence of steering potential, output of a particular detector and output of any other of said detectors, and means for thereafter switching said steering potential to said first input terminal associated with each of said AND gates of another of said registers.

12. A link circuit for controlling a telephone system comprising first register means coupled to store at least a first control signal transmitted through said telephone system, second register means, means responsive to the termination of said first control signal for decoupling said first register means and for coupling said second register means to store at least another control signal transmitted through said telephone system, means for generating a plurality of cyclically recurring time frames, means for comparing said stored control signals with said recurring time frames, and means responsive to said last named means for controlling spaced apart switching devices in said telephone system during said time frames which are identified by said stored control signals.

13. A link circuit for controlling the extension of calls through a telephone system comprising incoming telephone lines, means operatively associated with said lines for receiving control signals transmitted over said lines, means coupled to said receiving means for analyzing the components of said control signals, first register means normally coupled to said analyzing means, means for storing a first analyzed control signal in said first register means, second register means, means responsive to termination of said first control signal for coupling said second register means to store a second analyzed control signal in said second register, a plurality of scan lines, comparator means comprising a plurality of AND gates, means for individually connected each of said scan lines to input terminals of corresponding ones of said AND gates, means for coupling each of said registers to other input terminals of said AND gates for selectively marking said AND gates in accordance with said control signals stored in said registers, and means for energizing said scan lines to provide a plurality of time frames whereby certain of said AND gates are selectively rendered conductive during particular time frames which correspond to said stored signals.

14. The link circuit of claim 13 wherein each of said register means comprises a plurality of AND gates, each of said AND gates having at least two input terminals associated therewith, means for normally applying a steering signal to first input terminals of each of said AND gates associated with said first register means, means for applying signals to other of said input terminals of at least one selected AND gate in said first register in accordance with the characteristics of said first analyzed control signal, said means for coupling said second register comprising means for switching said steering signal from said AND gates associated with said first register to first input terminals of each of said AND gates associated with said second register means, and means for applying signals to other of said input terminals of at least one selected AND gate in said second register in accordance with the characteristics of said second analyzed control signal.

15. The link circuit of claim 14 wherein said analyzing means produces two component signals responsive to each of said control signals, said means for applying signals to said other input terminals of said AND gates comprise means whereby each of said AND gates is individually controlled responsive to a corresponding one of said signal components, and means for marking a third input terminal of each of said AND gates if any other of said signal components is present whereby each of said AND gates conducts only if two signal components are present.

16. The link circuit of claim 15 wherein each of said control signals represents a digit, each of said component signals is a distinctive frequency and said analyzing means comprises a plurality of filters each of which passes one of said frequencies.

17. The link circuit of claim 13 and means for detecting certain of said first control signals which have particular characteristics, means responsive to said detection of said first control signals for coupling said second register before the termination of said first control signal whereby said first control signal is stored in both of said registers thereby controlling the extension of calls responsive to the receipt of a single control signal.

18. A telephone system comprising a plurality of subscriber lines, means for individually connecting each of said subscriber lines to a corresponding group of switching elements in a network of spaced apart switching elements, means for generating a plurality of time frames each of which identifies one of said groups of spaced apart switching elements, a plurality of line circuits, each of said line circuits being individually connected between a corresponding one of said subscriber lines and one side of said network, means in each of said line circuits for detecting calling signals transmitted over a calling one of said subscriber lines, means in each of said line circuits for detecting time frames which identify the particular group of said switching elements to which said calling line connects, means responsive to a coincidence between said calling signal and said detected time frame for marking said particular group of spaced switching elements, link means connected to an opposite side of said network for operating one of said marked group of switching elements thereby extending said calling line to said link, and voice gate means in said link means for transmitting speech signals from said calling line through said link to another of said lines.

19. The telephone system of claim 18 and means responsive to control information transmitted over said calling line for selecting another of said groups of spaced switching elements, means for controlling one of said line circuits associated with said other group of switching elements during a particular time frame that is identified by said control information, test means for detecting idle or busy conditions on a called one of said subscriber lines during said particular time frame, and means responsive to said test means detecting an idle condition for connecting said called line to said voice gate thereby completing a speech path for said transmission of said speech signals through said link.

20. A telephone system comprising a plurality of subscriber lines, means for individually connecting each of said subscriber lines to a corresponding group of spaced apart switching elements, means for generating a plurality of time frames each of which identifies one of said group of spaced apart switching elements, a plurality of line circuits, each of said line circuits being individually associated with a corresponding one of said subscriber lines, means in each of said line circuits for detecting calling signals transmitted over a calling one of said subscriber lines, means in each of said line circuits for detecting time frames which identify the particular group of said switching elements to which said calling line connects, means responsive to a coincidence between said calling signals and said detected time frame for marking said particular group of spaced switching elements, means for operating one of said marked group of switching elements thereby extending said calling line, means responsive to control information transmitted over said calling line for selecting another of said group of spaced switching elements, means for controlling one of said line circuits associated with said other group of switching elements during a particular time frame that is identified by said control information, test means for detecting idle or busy conditions on a called one of said subscriber lines during said particular time frame, said test means comprising a busy bus and a seize bus which is common to all of said line circuits, means responsive to busy conditions on said subscriber lines for applying a marking to said busy bus during time frames which identify said busy subscriber lines, means responsive to said markings on said busy bus during said particular time frame for transmitting busy tone to said calling line, means responsive to an absence of said busy marking on said busy bus during said particular time frame for applying a marking to said seize bus during said particular time frame, and means responsive to said marking on said seize bus for selectively controlling said spaced switching elements.

21. A telephone system comprising a plurality of telephonic lines, a plurality of line circuits, means for individually associating each of said line circuits with a corresponding one of said lines, means for identifying each of said line circuits by cyclically recurring time frames, means responsive to digit information transmitted through said telephone system for selecting a particular one of said time frames, means responsive to said one time frame for causing the one of said line circuits that is identified thereby to transmit a busy indication if the associated line is then busy, means jointly responsive to said one time frame and said busy indication for preventing further extension of the call controlled by said digit information and for returning busy tone through said telephone system.

22. The telephone system of claim 21 and means responsive jointly to said one time frame and an absence of said busy indication for extending a seize signal to said one line circuit, and means responsive to said seize signal for extending a call through said telephone system to a called line.

23. The combination comprising, a plurality of lines each having a circuit individually associated therewith, a plurality of tens and units scan lines, said scan lines being common to a plurality of said circuits, each of said circuits comprising a two input AND gate, means for connecting one input terminal of each of said AND gates to an identifying tens scan line, means for connecting the other input terminal of each of said AND gates to an identifying units scan line, whereby one of said AND gates conducts when a tens scan line and a units scan line are simultaneously marked to indicate the line associated with said conductive AND gate, a busy bus and a seize bus which is common to all of said circuits, means responsive to busy conditions on said indicated line for applying a first signal to said busy bus during the time that said one AND gate conducts, means responsive to said signal on said busy bus during the time that said one AND gate conducts for preventing an electrical operation associated with said indicated line, means responsive to idle conditions on said indicated line for applying a second signal to said seize bus during the time that said one AND gate conducts, and means responsive to said signal on said seize bus for selectively causing said electrical operation on said indicated line.

24. A system comprising switching equipment, a plurality of circuits each identified by a particular time frame, a plurality of scan lines common to said circuits, scanner means for sequentially applying cyclically recurring time frame indications to said scan lines, means jointly responsive to first of said time frame indications on said scan lines and seizure signals transmitted through at least a portion of said system for operating certain of said switching equipment, and means jointly responsive to switch directing signals transmitted through at least a portion of said system and other of said time frame indications on said scan lines for operating other of said switching equipment.

25. The system of claim 24 and a plurality of links, means responsive to the operation of said certain switching equipment for extending connections to said links, means associated with said links for storing said switch directing signals, and said means for operating of said other switching equipment comprises means for comparing said stored switch directing signals and said indications applied to the said scan lines.

26. The system of claim 24 and two control busses common to said circuits, means responsive to first equipment condition indicating signals applied to one of said busses during said other time frame for blocking said operation of said other switching equipment, and means responsive to second equipment condition indicating signals applied to the other of said busses during said other time frame for applying control signals to said other bus for enabling said operation of said switching equipment.

27. A telephone system comprising a matrix of spaced switching elements, said matrix comprising first and second multiples connected to provide intersecting crosspoints, each of said multiples comprising switching conductors and control conductors, a plurality of electrical circuits each having an identifying designation, seize and busy busses common to all of said plurality of circuits, means for individually connecting said electrical circuits to corresponding ones of said first multiples, allotting means for selectively marking one of said control conductors associated with said second multiples, means for generating a plurality of time frames each of which represents one of said identifying designations, means effective during time frames which identify said circuits for applying control signals to one of said control conductors associated with the one of said first multiples which corresponds to said identified circuit, means responsive to a coincidence of said selective marking and said control signal for coupling said switching conductors at a particular one of said crosspoints, some of said means for applying control signals comprising means responsive to seizure signals transmitted over calling ones of said lines, and other of said means for applying control signals comprising said busses and means responsive to control information identifying called ones of said lines.

28. The telephone system of claim 27 and a plurality of links, each being individually associated with a corresponding one of said second multiples whereby closure of a crosspoint responsive to one of said seizure signals couples one of said links to one of said lines via said closed crosspoint and one of said first multiples, said allotting means being associated with some of said second multiples, and means controlled from said one link for selectively marking one of said control conductors of other of said second multiples.

29. The telephone system of claim 28 and a plurality of register means each being individually associated with a corresponding one of said links, means for storing in said register means digit control signals which identify a particular time frame, means responsive to an occurrence of said particular time frame for marking said seize bus to control said other means for applying control signals, and means responsive to a signal on said busy bus during said particular time frame for blocking said marking of said seize bus to preclude said control of said other means.

30. In a switching system, a plurality of lines, a matrix comprised of spaced apart switching elements, means for connecting each of said lines to at least one of said spaced switching elements, means for providing a plurality of time spaced control frames, each of said time frames representing one of said lines, means responsive to a first condition on a particular one of said lines during a time frame representing said particular line for operating one of said switching elements to which said particular line is connected, means for transmitting information signals identifying another of said lines over said particular line, seize and busy busses common to said lines, means responsive jointly to signals on said busses and to said information signals during a time frame representing said other line for operating one of said switching elements to which said other line is connected, and means for interconnecting said operated switching elements.

31. The system of claim 30 wherein said interconnecting means comprises a link which is individual to said operated switching elements, and said means responsive to said information signals comprises a register individual to said link.

32. The system of claim 30 wherein said spaced switching elements comprise first and second multiples connected to provide intersecting crosspoints, and common equipment for selectively marking said second multiples, said means for operating said switching elements comprising means for selectively applying markings to said first multiples, said operated switching elements being at crosspoints where said marked multiples intersect.

33. In a telephone system, a plurality of telephonic lines, means comprising a line circuit associated with each of said lines, means for selectively marking said line circuits responsive to the initiation of calls on said lines, finder means and connector means each comprising first and second multiples connected to provide intersecting crosspoints, means for allotting an idle one of said first multiples, means responsive to said marking of said line circuit for selectively marking said second multiple in said finder means in accordance with the identity of a calling line, means responsive to digit information transmitted over said calling line for selectively marking said second multiples in said connector means in accordance with the identity of a called one of said lines, means responsive to said allotting means for marking one of said first multiples in said finder and said connector, means for rendering crosspoints conductive in said finder means and said connector means responsive to a coincidence of said marked multiples, means for maintaining conductivity through said crosspoints for the duration of a telephone call, and means for operating said allotting means to select another of said first multiples to serve the next call.

34. In a telephone system, electronically controlled crosspoint matrices comprising finders and connectors for interconnecting selected telephonic circuits, each of said matrices including first and second multiples, means for individually connecting said first multiples in said finders to corresponding ones of said first multiples in said connectors, a plurality of telephonic lines each having an identifying designation, means for individually connecting said lines to said second multiples in accordance with said designations, means for sequentially allotting idle ones of said first multiples in said finder, means for selectively marking said second multiples in said finder in accordance with designations identifying a calling one of said lines which is to be coupled through said finder, and means responsive to a coincidence of said allotting and marking for rendering selected crosspoints conductive.

35. The telephone system of claim 34 and a line circuit individually associated with each of said lines, each of said line circuits comprising first control conductors associated with said second multiples of said finder and second control conductors associated with said second multiples of said connectors, said marking means comprising means responsive to calling signals on one of said lines for selectively marking one of said first control conductors in accordance with the designation of said calling line, and means responsive to digit information transmitted over said calling line for selectively marking one of said second control conductors associated with one of said line circuits that is individual to a called subscriber line.

36. A matrix having two parts; each part comprising some electrical circuits including switching conductors and first control conductors associated with vertical multiples, and other electrical circuits comprise switching conductors and second control conductors associated with horizontal multiples; means for individually connecting said switching conductors in one part of said matrix to corresponding ones of said switching conductors in the other part of said matrix, means for selectively marking one of said first control conductors and one of said second control conductors in each of said parts of said matrix, and coincidence responsive means comprising means responsive to said markings on said control conductors for interconnecting those of said switching conductors that are associated with said marked control conductors.

37. The matrix of claim 36 and a plurality of telephonic lines, means for connecting each of said lines to one of said horizontal multiples, means for generating a plurality of time frames each of which identifies one of said horizontal multiples, a plurality of line circuits, each of said line circuits being individually associated with a corresponding one of said lines, means in each of said line circuits for detecting calling signals on said associated line, means in each of said line circuits for detecting time frames which identify the horizontal multiples to which said associated lines connect, and means responsive to a coincidence between one of said calling signals and said detected time frame for controlling a spaced switching element.

References Cited in the file of this patent

UNITED STATES PATENTS

| | | |
|---|---|---|
| 2,667,540 | Den Hertog et al. | Jan. 26, 1954 |
| 2,739,185 | Panzerbeiter et al. | Mar. 20, 1956 |
| 2,854,316 | Faulkner | Sept. 30, 1958 |
| 2,898,406 | Davidson et al. | Aug. 4, 1959 |
| 2,912,510 | Den Hertog et al. | Nov. 10, 1959 |

FOREIGN PATENTS

| | | |
|---|---|---|
| 735,635 | Great Britain | Aug. 24, 1955 |